United States Patent

Miyazaki et al.

[11] Patent Number: 5,819,013
[45] Date of Patent: Oct. 6, 1998

[54] COMMUNICATION APPARATUS HAVING A PRINTER CONTROLLING RECORDING IN ACCORDANCE WITH A BILATERAL RECORD CORRECTION VALVE

[75] Inventors: Toshiki Miyazaki; Masanori Momose, both of Tokyo; Shinichiro Kohri, Kawasaki; Naomi Nakamura, Kawaguchi; Yasushi Morimoto, Yokohama, all of Japan

[73] Assignee: Canon Kabushiki Kaisha, Tokyo, Japan

[21] Appl. No.: 731,672

[22] Filed: Oct. 17, 1996

[30] Foreign Application Priority Data

Oct. 18, 1995 [JP] Japan .................................. 7-293795
Mar. 6, 1996 [JP] Japan .................................. 8-075429

[51] Int. Cl.$^6$ ........................................................ H04N 1/02
[52] U.S. Cl. ........................... 395/114; 358/438; 358/468; 347/3
[58] Field of Search ..................................... 358/400, 442, 358/437, 468, 434–436, 438, 439, 501–503; 348/730; 399/88–90; 379/102.04, 373–375, 413; 395/113–115; 347/19, 23, 183, 188, 191, 192, 3, 37; 400/323; H04N 1/00, 1/02

[56] References Cited

U.S. PATENT DOCUMENTS 5,276,459  1/1994  Danzuka et al. ......................... 358/503
5,325,209  6/1994  Manabe .................................... 358/437
5,416,596  5/1995  Suzuki et al. ........................... 358/439
5,596,353  1/1997  Takada et al. ............................ 347/19

*Primary Examiner*—Kim Yen Vu
*Attorney, Agent, or Firm*—Fitzpatrick, Cella, Harper & Scinto

[57] ABSTRACT

A communication apparatus suppresses an unnecessary recovery operation when the communication apparatus is raised from a low power consumption mode to a normal operation mode to shorten a time before a printer unit is ready for printing. When the printer unit wakes up from a sleep mode, a time counted by a recovery timer in a facsimile control unit is sent to the printer unit as time data through a bilateral path. A CPU in the printer unit adds time data stores in an NVRAM at the time of entry of the facsimile apparatus to the low power consumption mode to the sent time data to determine the recovery level based on the sum time data and the recovery operation is executed. When the supply of power to an ink jet printer is stopped to reduce the power consumption, a timer in the printer and a bilateral record correction value deviate so that the recovery operation which is to be executed at an interval of 72 hours cannot be executed at the correct time interval. A non-power-supply time of the printer is notified from the main unit to the printer through a serial communication unit when the power is supplied to the printer next time in stopping the supply of power to the printer for power saving so that the timer in the printer is corrected.

5 Claims, 21 Drawing Sheets

FIG. 6

| COMMAND (ABBREV.) | CODE | FUNCTION | RETURNED STATUS |
|---|---|---|---|
| SR0 | 01H | REQUEST FOR STATUS 0 | STATUS 0 |
| SR1 | 02H | REQUEST FOR STATUS 1 | STATUS 1 |
| SR2 | 04H | REQUEST FOR STATUS 2 | STATUS 2 |
| SR3 | 07H | REQUEST FOR STATUS 3 | STATUS 3 |
| SR4 | 08H | INSTRUCT TIME DATA SETTING | STATUS 0 |
| EC0 | 40H | RESET | STATUS 0 |
| EC2 | 45H | RELEASE MISPRINT | STATUS 0 |

FIG. 7

| | BIT 0 | BIT 1 | BIT 2 | BIT 3 | BIT 4 | BIT 5 | BIT 6 | BIT 7 |
|---|---|---|---|---|---|---|---|---|
| STATUS 0: BASIC STATUS | ODD PARITY | CALL | ...... | ON WAITING | MISPRINT | ON FEEDING PAPER | ...... | 0 |
| STATUS 1: CALL FOR OPERATOR | ODD PARITY | ...... | DOOR OPEN | JAM | NO PAPER | ...... | NO CARTRIDGE | 0 |
| STATUS 2: CALL FOR SERVICE MAN | ODD PARITY | ...... | FEED MOTOR ERROR | 0 | CARRIAGE MOTOR ERROR | ...... | ...... | 0 |
| STATUS 3: DETAILS OF MISPRINT | ODD PARITY | ...... | PRE-FEED TIME OUT | PAPER SIZE INCOINCIDENT | PAPER FEED ERROR | ...... | ...... | 0 |

FIG. 8

| BIT 7 | COMMAND ERROR |
| --- | --- |
| BIT 6 | VALID DATA 6-BIT |
| BIT 5 | |
| BIT 4 | |
| BIT 3 | |
| BIT 2 | |
| BIT 1 | |
| BIT 0 | ODD PARITY |

FIG. 9

| | BIT 0 | BIT 1 | BIT 2 | BIT 3 | BIT 4 | BIT 5 | BIT 6 | BIT 7 |
|---|---|---|---|---|---|---|---|---|
| HIGH ORDER BYTE OF TIME DATA | ODD PARITY | HIGH ORDER BITS OF TIME DATA | HIGH ORDER BITS OF TIME DATA | HIGH ORDER BITS OF TIME DATA | HIGH ORDER BITS OF TIME DATA | HIGH ORDER BITS OF TIME DATA | HIGH ORDER BITS OF TIME DATA | 0 |
| LOW ORDER BYTE OF TIME DATA | ODD PARITY | LOW ORDER BITS OF TIME DATA | LOW ORDER BITS OF TIME DATA | LOW ORDER BITS OF TIME DATA | LOW ORDER BITS OF TIME DATA | LOW ORDER BITS OF TIME DATA | LOW ORDER BITS OF TIME DATA | 0 |

COMMUNICATION APPARATUS HAVING A PRINTER CONTROLLING RECORDING IN ACCORDANCE WITH A BILATERAL RECORD CORRECTION VALVE

BACKGROUND OF THE INVENTION

1. Field of the Invention

The present invention relates to a communication apparatus which adopts ink jet type print means.

2. Related Background Art

A facsimile apparatus has been known as an example of a communication apparatus.

As the recent population of the use of plain papers in the facsimile apparatus, a serial printer represented by an ink jet type is frequently adopted as a printer unit built in the facsimile apparatus.

Since the serial printer has been inherently designed to print while it is connected to a personal computer (hereinafter referred to as a PC), many serial printers use an interface which complies with the Centronix type. The Centronix type interface is normally unilateral and is used to transmit data to be printed and control codes from the PC to a printer unit.

In the ink jet type printer, an operation to eliminate the clogging of ink discharge nozzles (hereinafter referred to as a recovery operation) is required at the start-up. During the recovery operation, some amount of ink is consumed but if a time elapsed from the previous recovery operation is short, the clogging may be usually eliminated by a simplified recovery operation. The prior art ink jet type printer is constructed to suppress the wasteful consumption of the ink by changing a scale of the recovery operation in accordance with the elapsed time from the previous recovery operation.

In a prior art facsimile apparatus, an operation mode may be shifted from a normal operation mode to a low power consumption mode during a stand-by mode in which no action is conducted. In the low power consumption mode, an operation of a control unit in the printer unit may be stopped or rendered to a dormant state called a sleep mode to suppress the power consumption.

However, when the facsimile apparatus enters the low power consumption mode, a timer in the control unit of the printer unit is also stopped so that the time measurement is not attained. As a result, in the prior art facsimile apparatus, it is designed to conduct a maximum scale of recovery operation whenever the operation mode is raised from the low power consumption mode to the normal operation mode. Thus, the consumption of the ink increases and a long time is required to start up the printer unit.

A facsimile apparatus which uses the ink jet printer has been known. Such a facsimile apparatus has separate control means for the ink jet printer and a main unit for conducting communication, reading and data coding/decoding which are fundamental operations of the facsimile apparatus, and has a serial signal line between those control means.

In the facsimile apparatus comprising separate control means for the record means and the main unit, setting information of the record means is set by serial communication. In the prior art, no countermeasures to save the power consumption has been attempted and the supply of the power to the ink jet printer has not been stopped. Accordingly, in the prior art, a timer in the ink jet printer and a bilateral record correction value are not managed by the main unit.

Accordingly, in the above prior art apparatus, when the supply of the power of the ink jet printers is to be stopped in order to save the power consumption, the timer in the printer and the bilateral record correction value are deviated so that the recovery operation which is to be conducted by the printer at an interval of 72 hours cannot be conducted at a proper time interval or the printer may not be properly operated because of the deviation in the bilateral records.

SUMMARY OF THE INVENTION

It is an object of the present invention to improve a communication apparatus.

It is another object of the present invention to improve a facsimile apparatus.

It is a still another object of the present invention to provide a communication apparatus or a facsimile apparatus which suppresses unnecessary recovery operation when an operation of the facsimile apparatus is raised from a low power consumption mode to a normal operation mode so that a time before the printer unit is ready to print is shortened.

It is a further object of the present invention to provide a communication apparatus or a facsimile apparatus which enables record means to operate in accordance with initially set bilateral record correction value even when the record means cannot record the bilateral record correction value.

BRIEF DESCRIPTION OF THE DRAWINGS

FIG. 6 illustrates a function of a status request command, FIG. 7 illustrates an example of a reply status format, FIG. 8 illustrates an example of a status request command format, FIG. 9 illustrates an example of a time data format.

DETAILED DESCRIPTION OF THE PREFERRED EMBODIMENTS

Embodiment 1

An embodiment of the communication apparatus of the present invention is now explained by a facsimile apparatus with reference to the accompanying drawings.

Figures 1, 2:
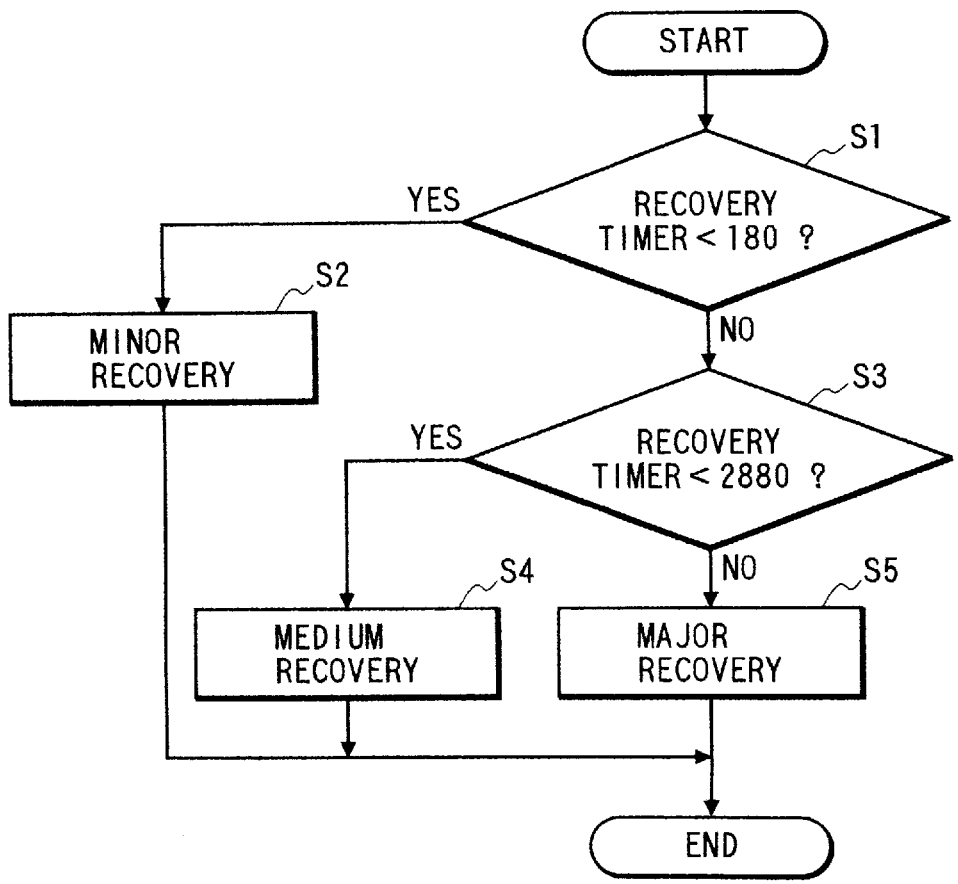
FIG. 1 illustrates a correlation between an elapsed time from a previous recovery operation and a recovery level.
FIG. 2 shows a flow chart of a recovery level determination process.

FIG. 1 shows a correlation between an elapsed time from a previous recovery operation (an operation to eliminate the clogging of ink discharge nozzles at the start-up) and a recovery level of the recovery operation in the facsimile apparatus in accordance with the present embodiment. In the present embodiment, the recovery level is divided into three stages depending on the elapsed time and they are called minor recovery, medium recovery and major recovery. The number of times of ink discharge to eliminate the clogging of the ink discharge nozzles increases in the order of minor recovery→medium recovery→major recovery and a longer time is required to complete the recovery operation. In the present embodiment, which recovery level is required is determined by referring time data counted by a recovery timer.

FIG. 2 shows a flow chart of a recovery level determination process in the present facsimile apparatus.

In a step S1, whether the time data counted by the timer is smaller than 180 minutes or not is determined, and is it is smaller than 180 minutes, the minor recovery is conducted in a step S2. If the time data is not smaller than 180 minutes in the step S1, whether the time data is smaller than 2880 minutes or not is determined in a step S3. If it is smaller than 2880 minutes, the medium recovery is conducted in a step S4. If the time data is not smaller than 2880 minutes in the step S3, the major recovery is conducted in a step S5. When the recovery operation in the step S2, S4 or S5 is completed, the process is immediately terminated.

Figure 3:
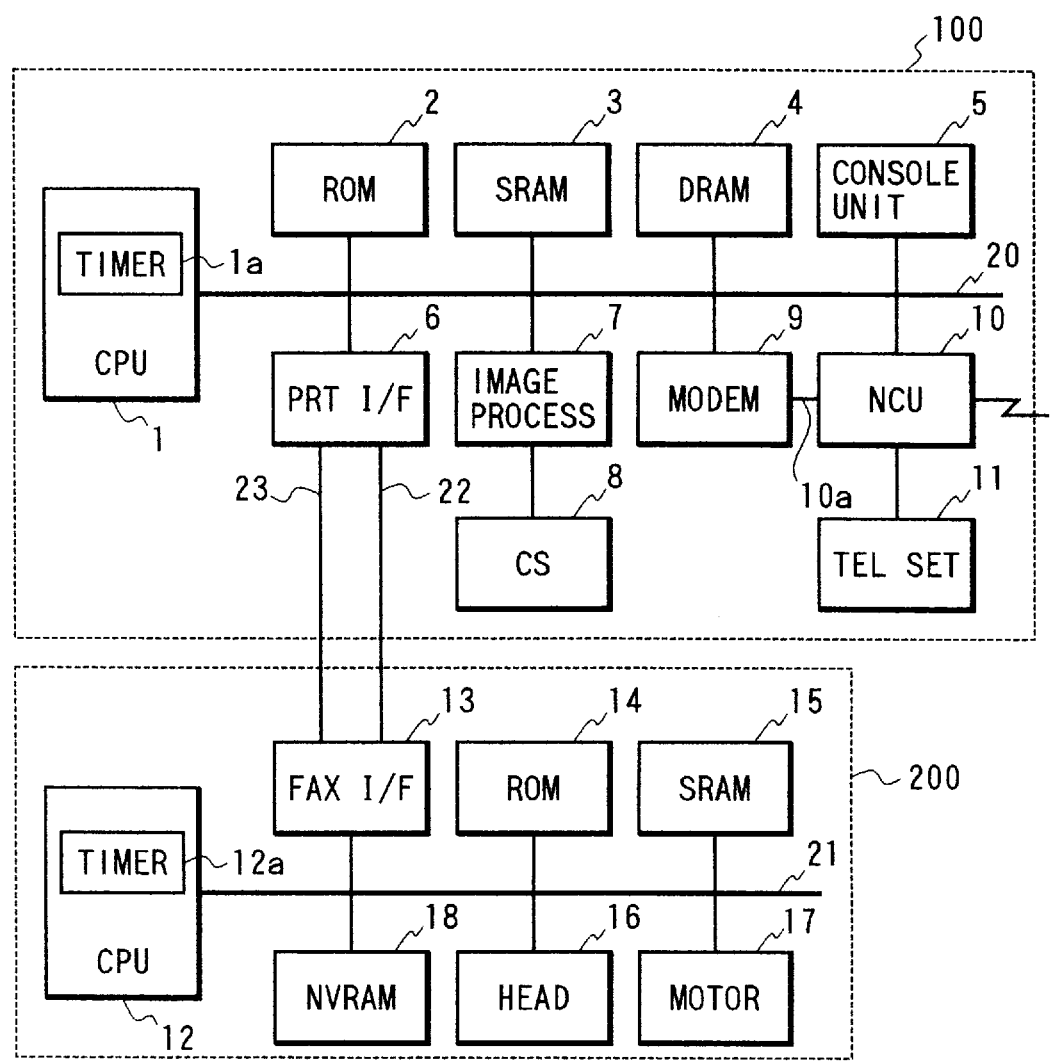
FIG. 3 shows a block diagram of a configuration of a facsimile apparatus in accordance with an embodiment of the present invention.

FIG. 3 shows a block diagram of a configuration of the facsimile apparatus which can execute the above recovery operation. The facsimile apparatus comprises a facsimile control unit 100 and a printer unit 200 which is the record means adopting an ink jet type.

The facsimile control unit 100 comprises the following units: a CPU 1 for controlling the facsimile control unit 100 and containing a recovery timer 1a as second count means for counting a time during which the facsimile apparatus is in the low power consumption mode; a ROM 2 for storing a control program of the CPU 1; an SRAM 3 for storing image management data, registration data, etc.; a DRAM 4 for storing image information; a console unit 5 for accepting an operation by an operator; a printer interface (I/F) unit 6 as notify means which is connected to a facsimile interface to be described later in the printer unit 200 to communicate with the printer unit 200; a contact type read sensor (CS) 8 for reading image data of a document sheet; an image processing unit 7 connected to the CS 8 for image-processing the image information read by the CS 8; a modem 9 for modulating and demodulating a digital signal and an analog signal; a network control unit (NCU) 10 connected to a public network for controlling the public network; and a telephone set 11 used by the operator to speak with a destination station. The CPU 1, the ROM 2, the SRAM 3, the DRAM 4, the console unit 5, the printer I/F unit 6, the image processing unit 8, the modem 9 and the NCU 10 are interconnected through a system bus 20. The CS 8 is connected to the image processing unit 7 and the telephone set 11 is directly connected to the NCU 10. The modem 9 is connected to the NCU 10 through a data bus 10a.

The printer unit 200 comprises the following units: a CPU 12 for controlling the printer unit 200 and for functioning as recovery execution means which contains a recovery timer 12a as first count means for counting an elapsed time from a previous recovery operation; a facsimile interface (I/F) 13 for communicating with the facsimile control unit 100; a ROM 14 for storing a control program of the CPU 12; an SRAM 15 used as a working area of the CPU 12; a print head for printing; a motor 17 for feeding a record sheet; and an NVRAM 18 as back-up memory means for storing setting data of the printer unit 200 and so on: The respective units 12 to 18 are interconnected through a system bus 21.

The printer I/F unit 6 is connected to the facsimile I/F unit 13 by an image path 22 and a bilateral path 23 for transmitting and receiving commands and data.

Figure 4:
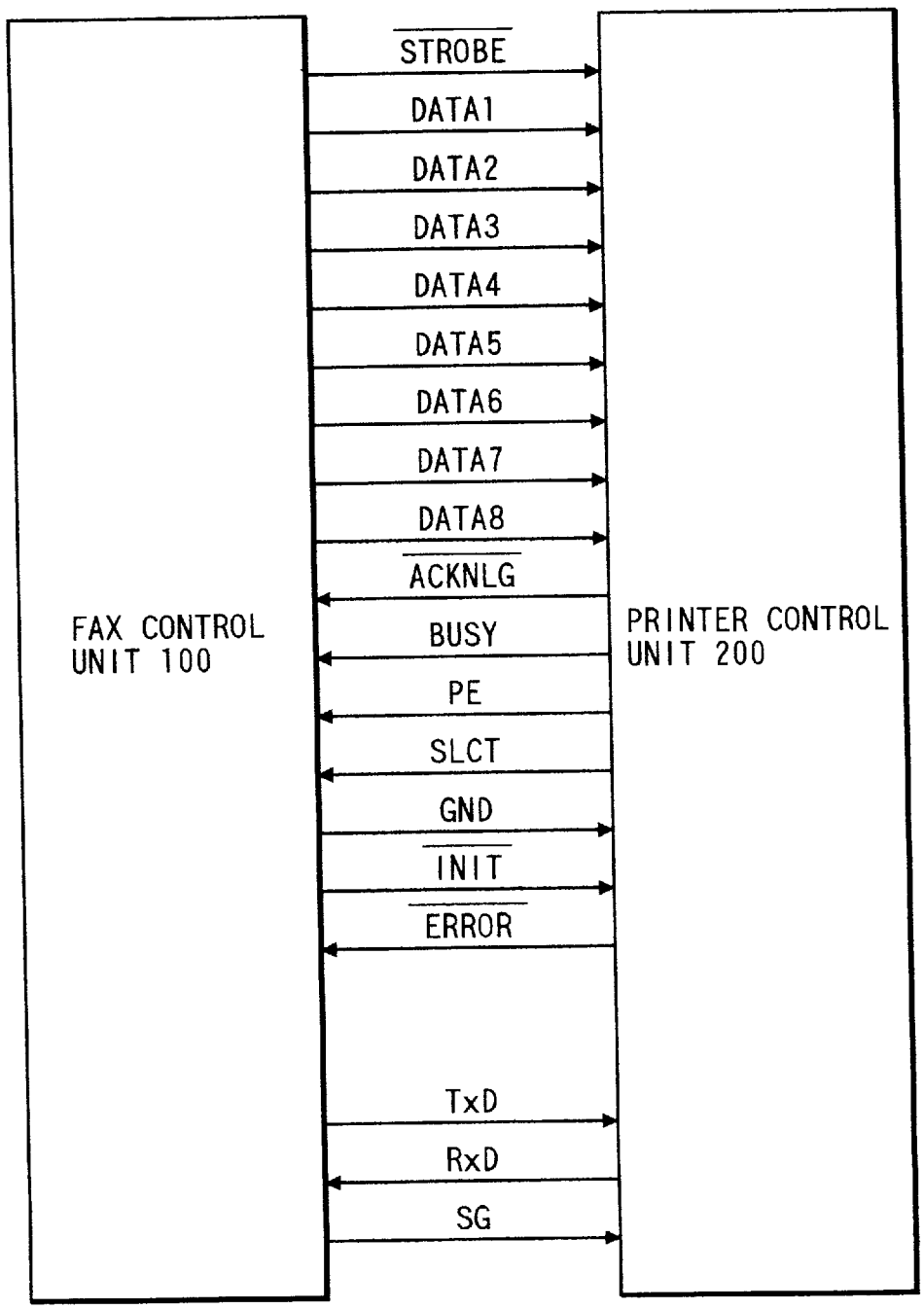
FIG. 4 illustrates details of an image path and a bilateral path shown in FIG. 3.

FIG. 4 shows an interface chart for specifically illustrating the connection between the printer I/F unit 6 and the facsimile I/F unit 13. In the present embodiment, a parallel I/F compatible to the Centronix specification is used as the image path 22 and an asynchronous serial I/F is used as the bilateral path 23. In FIG. 3, sixteen lines from a "STROBE (data strobe pulse)" to an "ERROR" line constitute the image path 22, and three lines, a "TxD" line, a "RxD" line and a "SG" line constitute the bilateral path.

In the above configuration, the facsimile control unit 100 continuously monitors the printer unit 200 to check whether the printer unit 200 is ready to print or not in order to notify to a user or a service man if the printer unit 200 is not ready to print.

Figure 5:
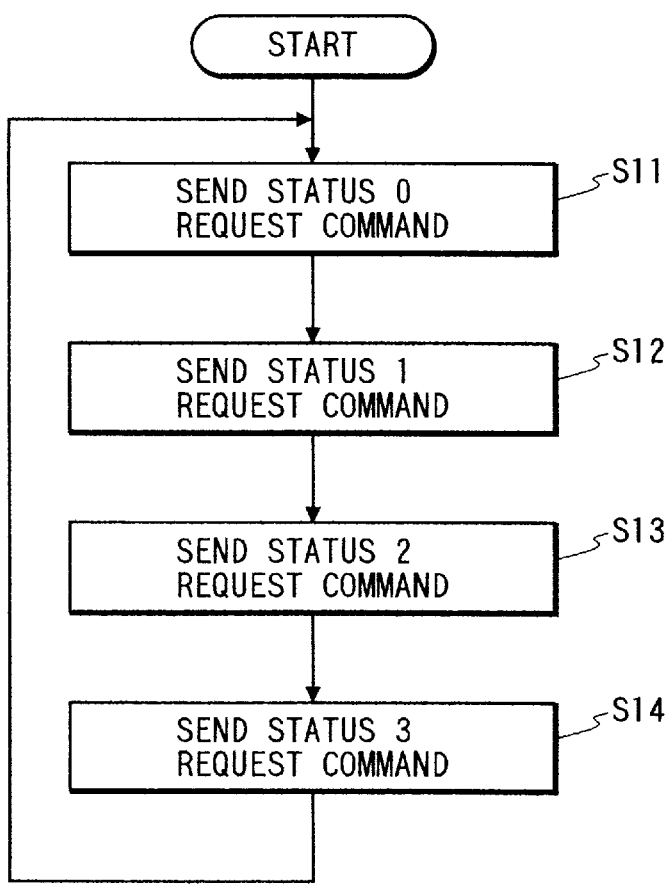
FIG. 5 shows a flow chart of a status request command send process of a printer unit.

Specifically, as shown in a flow chart of FIG. 5, status request commands for requesting status 0 to 3 are sequentially issued from the facsimile control unit 100 to the printer unit 200. By checking the reply status, whether the printer unit 200 is ready to print or not is checked.

The status request commands include four types SR0 to SR3 as shown in FIG. 6. In addition to the status request commands, the commands sent from the facsimile control unit 100 to the printer unit 200 include execution commands for directing the execution of operations such as a time data setting command, a reset command and a mis-print release command shown in FIG. 6. The reply status includes four types of status corresponding to the respective status request commands as shown in FIG. 7.

As shown in FIG. 8, the status request command is of one-byte length, and a bit 0 is used as an odd parity bit and a bit 7 is used as an error. Accordingly, an effective data length is 6-bit length. The status request command is sent from the CPU 1 of the facsimile control unit 100 to the CPU 12 of the printer unit 200 through the printer I/F unit 6, the bilateral bus 23 and the facsimile I/F unit 13. The CPU 12 checks the transmitted status request command and if it is interpretable, it sends back a status corresponding to the command. If it is not interpretable, the printer unit 200 sets "1" to only the error bit at the bit 7 and sends back 80H.

When a parity error occurs during the reception of the status sent back from the printer unit 200, the facsimile control unit 100 resends the status request command. In the present embodiment, the resending of the status request command is conducted up to three times.

The exchange of the time data between the facsimile control unit 100 and the printer unit 200 is expressed by unit of minute and it is sent in two, high order and low order blocks as 6-bit×2 numeric data s shown in FIG. 9. A maximum value represented by the data command of FIG. 9 is $2^{12}$ or 4096. The counting of the time is conducted by the recovery timer 1a built in the CPU 1 and the recovery timer 12a built in the CPU 12. In the present embodiment, a maximum time countable by the recovery timers 1a and 12a is 2880 minutes (two days). Even if a time longer than 2880 minutes is counted, the recovery timer 1a is always kept 2880 minutes and the printer unit 200 conducts the major recovery in this case as shown in FIG. 2.

Figure 10:
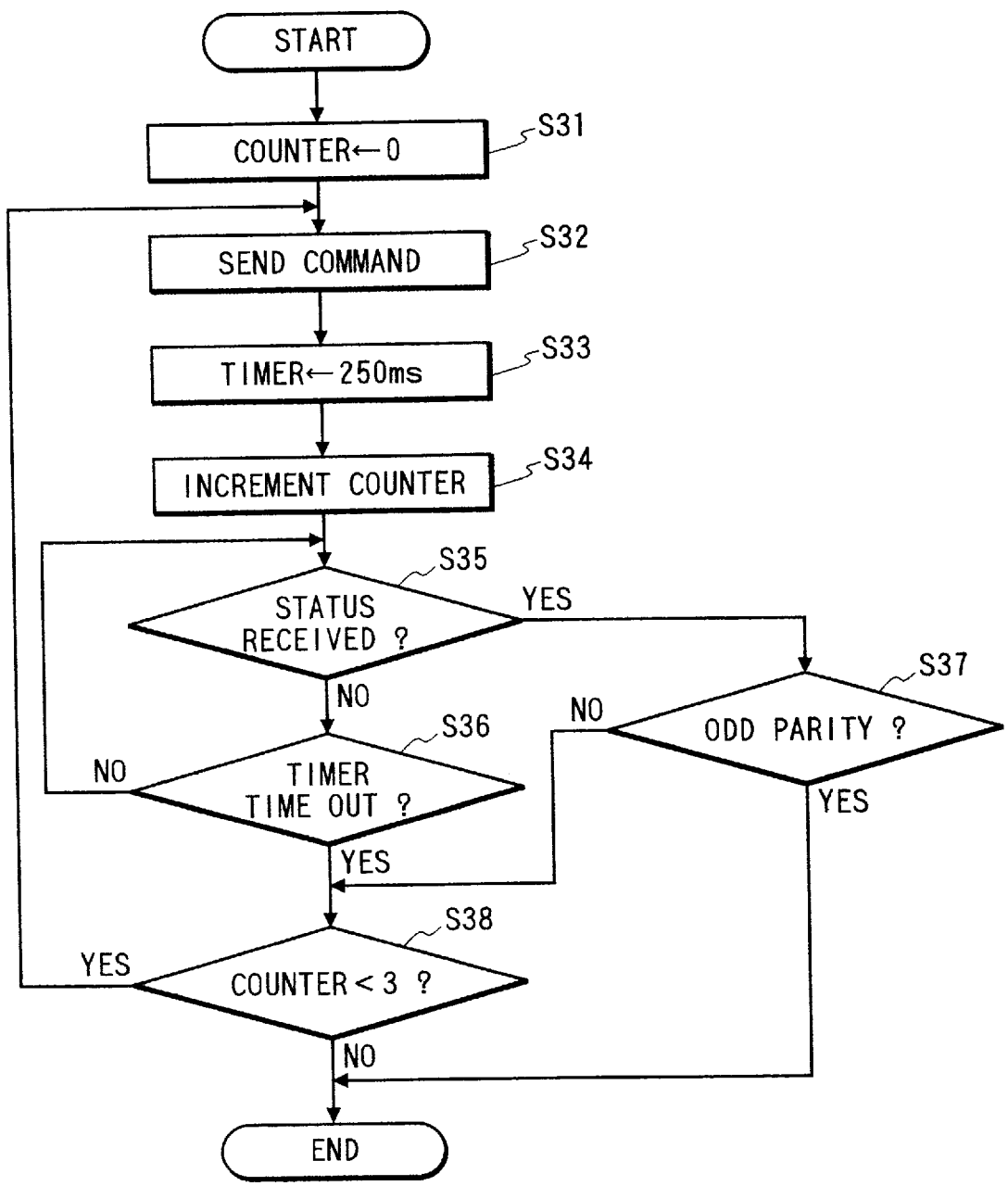
FIG. 10 shows a flow chart of a printer monitor task by a facsimile control unit.

FIG. 10 shows a flow chart of a detailed process of a printer monitor task conducted in the steps S11 to S14 shown in FIG. 5. A program for executing the present flow chart is stored in the ROM 2 of the facsimile control unit 100 and it is executed by the CPU 1.

When the status request command is to be sent, a counter which indicates the number of times of execution of the process of steps S32 et seq to be described later is first initialized (step S31). Then, the status request command is sent (step S32) and 250 ms is set in a timer, not shown, in the CPU 1 as a status reception wait time (step S33).

The counter is incremented by one (step S34) and whether the status has been received by the printer interface 6 or not is determined (step S35). If the status has not been received, whether the timer set in the step S33 is timed out or not is determined (step S36). If the timer is not timed out, the process returns to the step S35 to repeat the check of the status reception.

If the status has been received in the step S35, the received status is parity-checked (step S37). If the received status parity is odd, it means that the status has been correctly received without parity error and the process is terminated.

If the status is not received in the step S35 and the timer is timed out in the step S36, or if the parity is even in the step S37, the content of the counter or the number of times of sending of the status request command is checked (step S38). If the content of the counter is not larger than three, the process returns to the step S32 to repeat the steps S32 to S38. If the content of the counter is three or larger, the reception of the status is given up and the process is immediately terminated.

The status of the printer unit 20 received in this manner is held in the SRAM 3 of the facsimile control unit 100 and referred as required.

Figure 11:
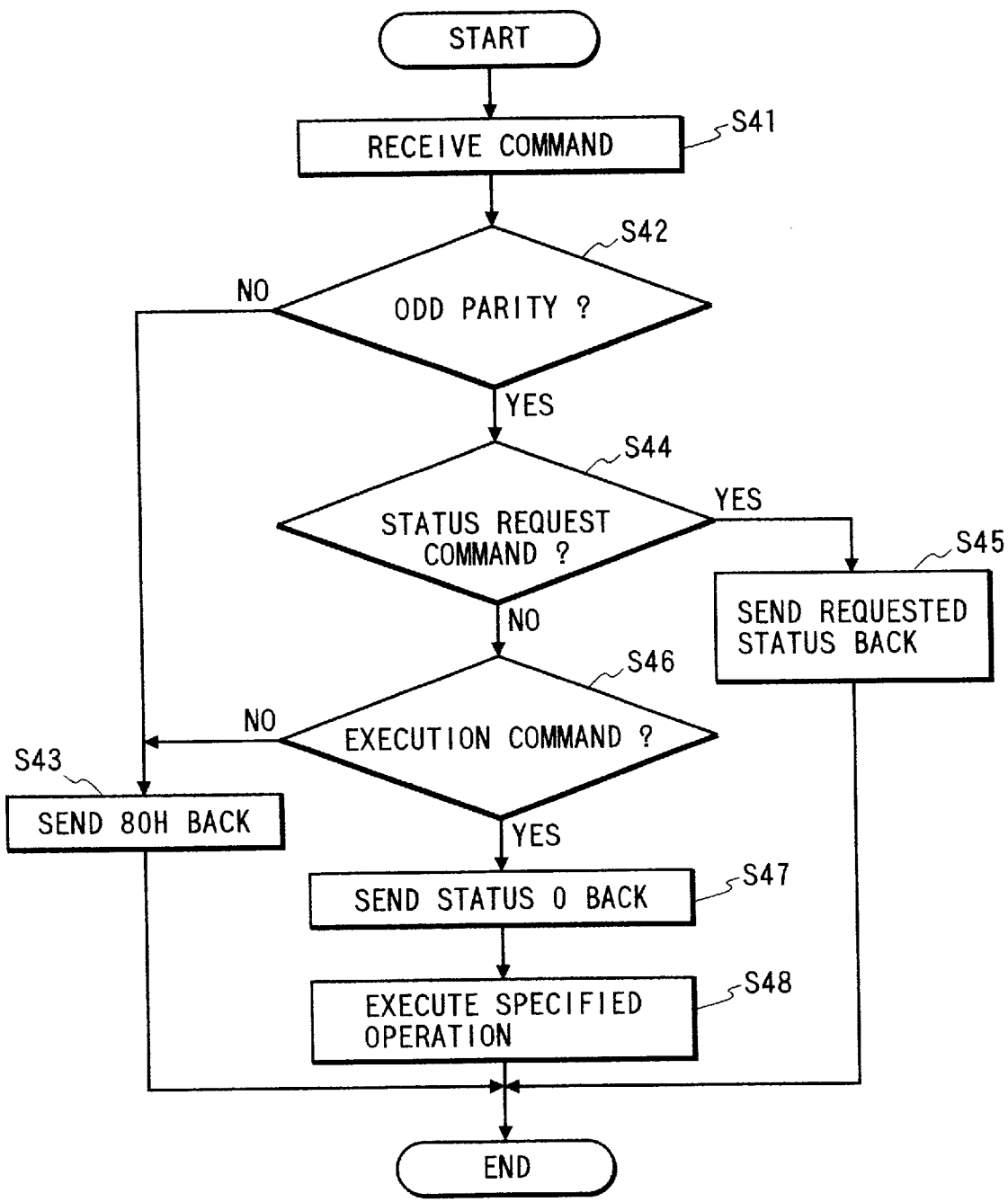
FIG. 11 shows a flow chart of an operation process of the printer unit when a status is sent.

FIG. 11 shows a flow chart of an operation process of the printer unit 200 when the status request command sent from the facsimile control unit 100 in accordance with the flow chart of FIG. 10 is received. A program for executing the present flow chart is stored in the ROM 14 of the printer unit 200 and it is executed by the CPU 12.

When the status request command is received (step S41), the received status request command is parity-checked (step S42). If the parity is even, it means a command error and only the error bit at the bit 7 is set and 80H is sent back (step S43), and the present process is terminated.

If the parity is odd in the step S42, whether the received command is the status request command or not is determined (step S44). If the received command is the status request command, a status corresponding to the received status request command is sent back to the facsimile control unit 100 (step S45).

If the received command is not the status request command, whether the received command is an execution command or not, that is, whether it is one of the commands SR4, EC0 and EC2 shown in FIG. 6 or not is determined (step S46). If it is the execution command, a status is sent back to notify the accept of the execution command (step S47) and an operation specified by the execution command is executed (step S48). The status to notify the accept of the command is a status 0 in the present embodiment. When the specified operation is completed, the present process is terminated.

If the received command is not the execution command in the step S46, it means that the command interpretation by the CPU 12 of the printer unit 200 is not possible and only the bit 7 is set in a step S43 as it was for the parity error and 80H is sent back, and the process is terminated.

By this process, the printer unit 200 can respond to the two types of commands, the status request command and the execution command, without affecting to the image path 22.

Figure 12:
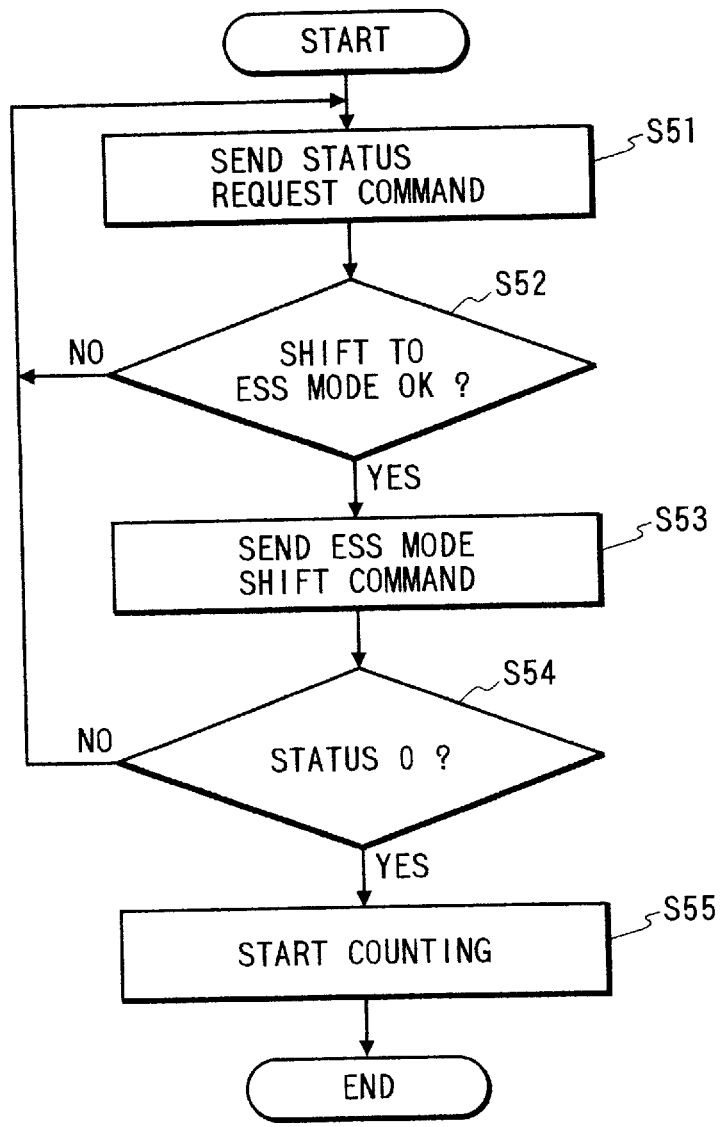
FIG. 12 shows a flow chart of an operation process of the facsimile control unit when an operation mode is shifted to a low power consumption mode.

FIG. 12 shows a flow chart of a shift process from the normal operation mode to a low power consumption mode (or ESS (energy saving) mode) executed by the facsimile control unit 100.

As shown in FIG. 10, the status request signal is first sent (step S51), and when the status of the printer unit 200 is received, whether the printer unit 200 may be shifted to the low power consumption mode or not is determined based on the received status (step S52).

If any error occurs in the printer unit 200 at this time or the printer unit 200 is driving the print head 16 and busy for printing, that is, if the shift to the low power consumption mode is not permitted, the steps S51 and S52 are repeated and the process waits until the above status is released.

If the shift to the low power consumption mode is permitted in the step S52, a low power consumption mode shift command is sent from the facsimile control unit 100 to the printer unit 200 through the bilateral path 23 (step S53). Whether the status sent back from the printer unit 200 for the transmitted low power consumption mode shift command is status 0 or not is determined (step S54). If the sent back status is the status 0, it is determined that the printer unit 200 correctly received the low power consumption mode shift command and the facsimile apparatus is shifted to the low power consumption mode. At the same time, the recovery timer la is started to count the time during which the printer unit 200 is in the low power consumption mode and the counting is started (step S55).

Figure 13:
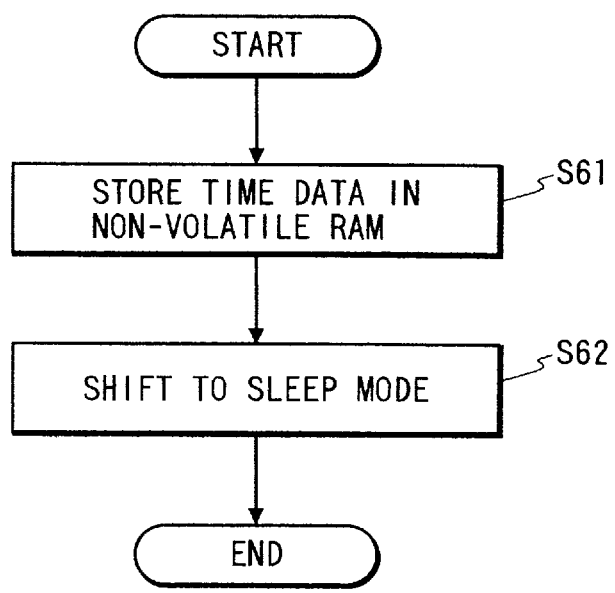
FIG. 13 shows a flow chart of an operation process of the printer unit when the operation mode is shifted to the low power consumption mode.

FIG. 13 shows a flow chart of an operation process of the printer unit 200 when it is shifted to the low power consumption mode.

When the low power consumption mode shift command sent from the facsimile control unit 100 in the step S53 of FIG. 12 is received as the execution command in the step S46 of FIG. 11, the present process is started.

First, the time data counted by the recovery timer 12a in the CPU 12 is stored in the NVRAM 18 (step S61), and the printer unit 200 is shifted to the sleep mode (step S62). Thus, the facsimile apparatus is shifted to the low power consumption mode.

Figure 14:
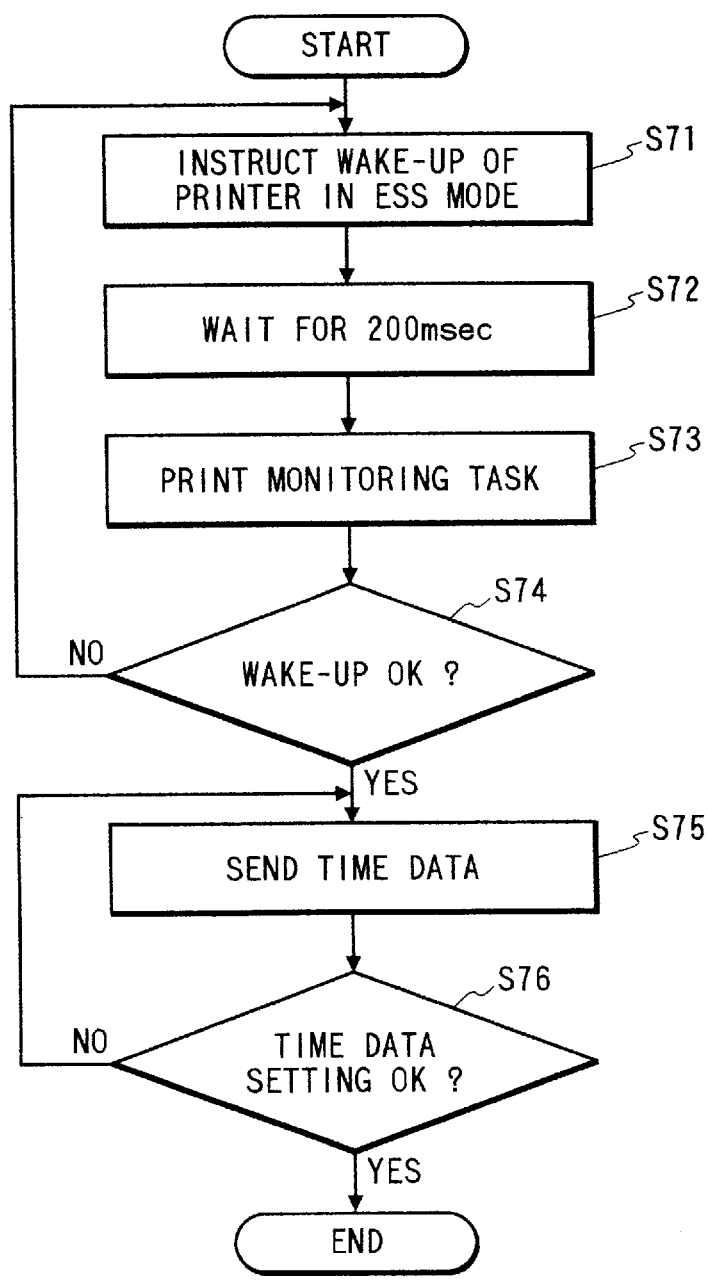
FIG. 14 shows a flow chart of an operation process of the facsimile control unit when it is woken up from the low power consumption mode.

FIG. 14 shows a flow chart of an operation process of the facsimile control unit 100 when the facsimile apparatus is raised from the low power consumption mode.

First, a wakeup command is issued to the printer unit 200 (step S71). In the low power consumption mode, the printer unit 200 is in the sleep mode and the printer unit is woken up by inputting the wakeup command to a non-maskable interrupt (NMI) port, not shown, of the CPU 12. After the wakeup command, the process is in a wait status for the wakeup of the printer unit 200 (step S72). In the present embodiment, the wait time is 200 ms. After the elapse of the wait time, a command to request a status to determined whether the printer unit 200 has safely woke up or not is sent in accordance with the printer monitor task shown in FIG. 10 and a status corresponding to the request is received (step S73).

Whether the printer unit 200 safely woke up or not is determined based on the status received in the step S73 (step S74), and if an error is detected, the process returns to the step S71 and the printer unit 200 is restarted up. If the printer unit 200 safely woke up, the time counted by the recovery timer 1a in the step S55 of FIG. 12 is set to the printer unit 200 as the time data in unit of minute in two runs (step S75).

Figure 15:
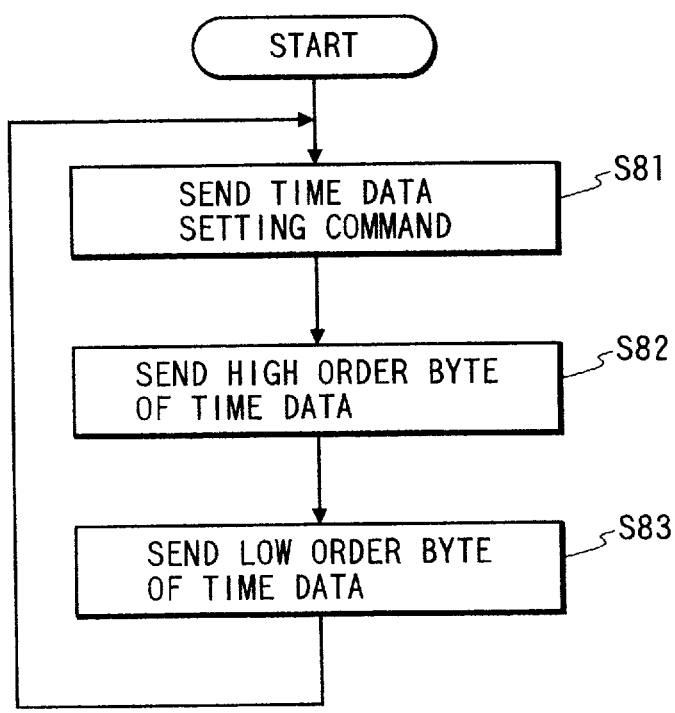
FIG. 15 shows a flow chart of a time data send process from the facsimile control unit to the printer unit.
Figure 16:
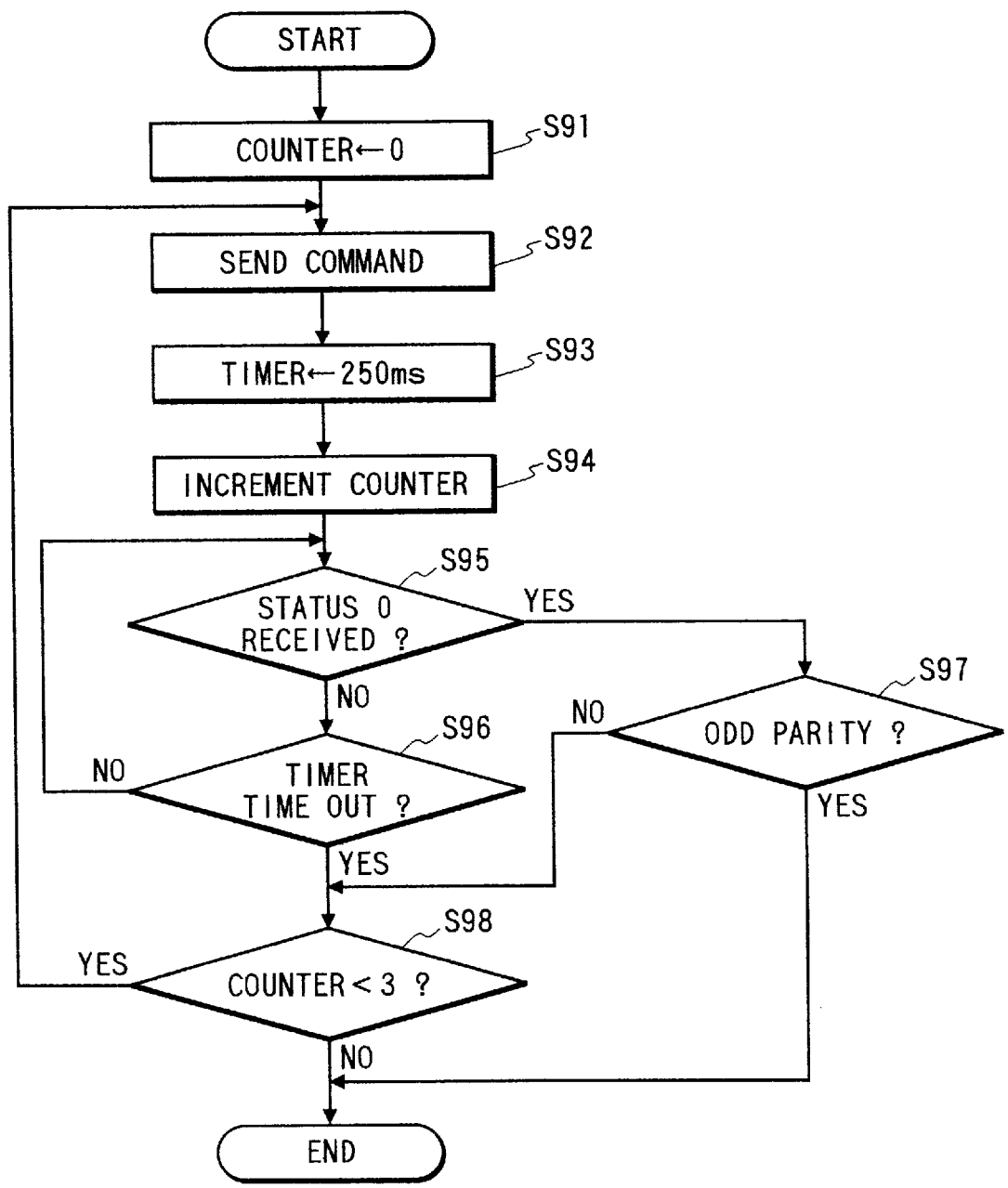
FIG. 16 shows a flow chart of a time data send process from the facsimile control unit to the printer unit.

Detail of the time data sending process conducted in the step S75 is shown in FIGS. 15 and 16. FIG. 15 shows a flow chart of the sequence of commands sent by the facsimile control unit 100. First, the time data setting command (SR4) is sent (step S81) and then the high order byte data and the low order byte data of the time data shown in FIG. 9 are sequentially sent (steps S82, S83).

FIG. 16 shows a flow chart of a detailed process of the time data setting command sending in the step S81. Steps S91 to S94 are same as the steps S31 to S34 shown in FIG. 10.

As shown in FIG. 6, the time data setting command requests the status 0 as the reply status from the printer unit 200. Thus, in the step S95, whether the status 0 has been received or not is determined, and if the status 0 has been received, the process proceeds to a step S97, and if the status 0 has not been received, the process proceeds to a step S97. The steps S96 to S98 are same as the steps S36 to S38 shown in FIG. 10.

Returning to FIG. 14, when the time data is sent to the printer unit 200 by the process shown in FIG. 15, the status 0 is sent back to the facsimile control unit 100 from the printer unit 200 as will be described later. The facsimile control unit 100 checks the sent-back status to determine whether the time data has been correctly sent or not (step S76). When it has been correctly sent, the present process is terminated. If it has not been correctly sent, the process returns to the step S75.

Figure 17:
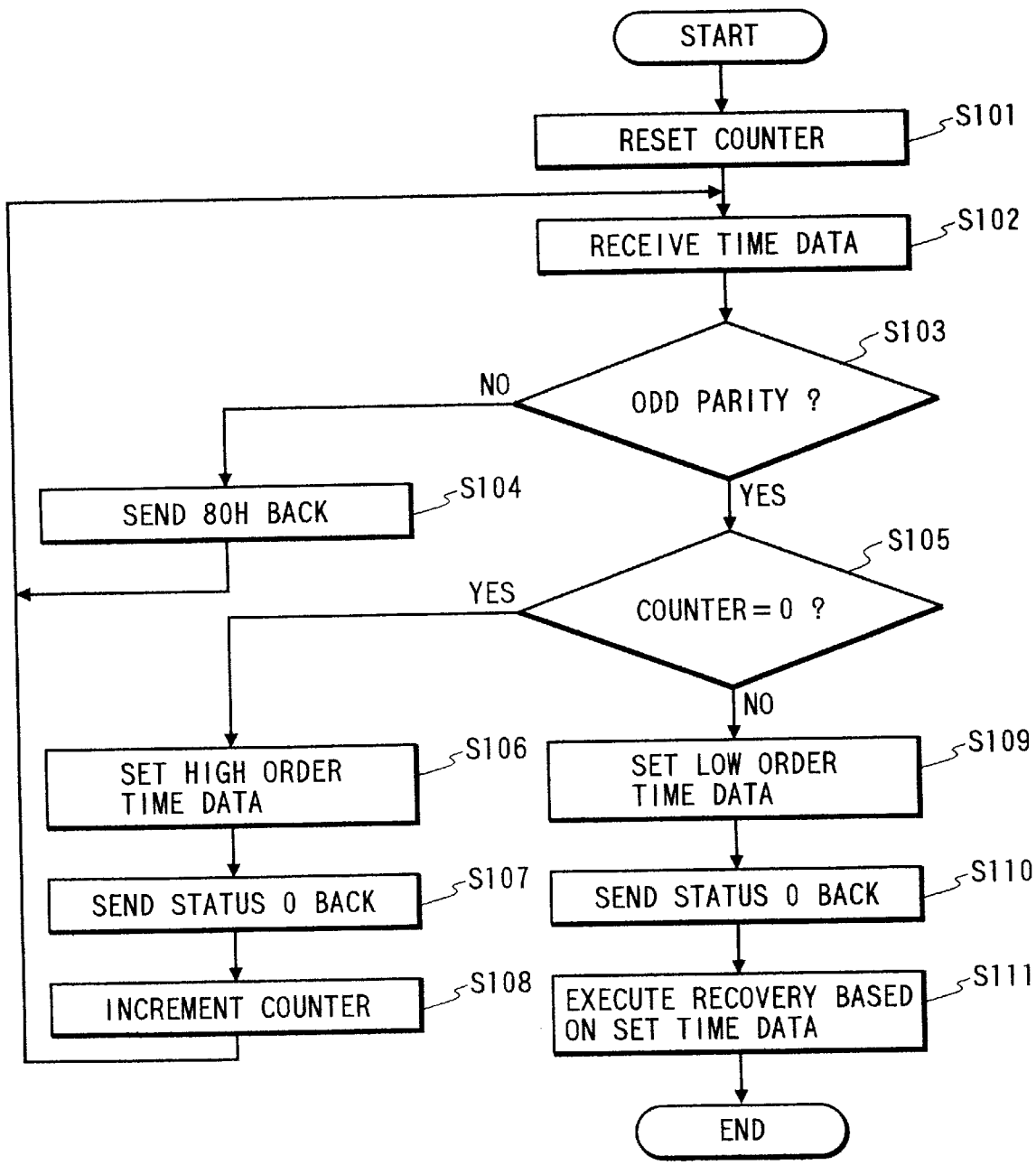
FIG. 17 shows a flow chart of an operation process of the printer unit when it is woken up from the low power consumption mode.

FIG. 17 shows a flow chart of an operation process of the printer unit 200 when the time data setting command sent from the facsimile control unit 100 is received.

When the time data setting command is received, a multi-byte command receiving counter is first reset to 0 (step S101). In the present embodiment, the multi-byte command receiving counter is provided in the CPU 12.

Then, the time data sent from the facsimile control unit 100 is received (step S102) and the time data is parity-checked (step S103). If the parity is even, it means an error and the bit 7 is set to 1 and 80H is sent back (step S104).

If the parity is odd, whether the content of the multi-byte command receiving counter is 0 or not is determined (step S105). If the content is 0, it is determined that the time data received in the step S102 is the first time data or the high order byte data, and it is stored in a predetermined area of the SRAM 15 as the high order time data (step S106). Then, the status 0 is sent back to the facsimile control unit 100 and the content of the multi-byte command receiving counter is incremented by one, and the process returns to the step S102 to receive the next time data.

If the count is not 0 in the step S105, it is determined that the time data received in the step S102 is the second time data or the low order byte data, and it is stored in a predetermined area of the SRAM 15 as the low order time data (step S109) and the status 0 is sent back to the facsimile control unit 100 (step S110).

Compete time data is prepared from the high order time data stored in the step S106 and the low order time data stored in the step S109, and the time data stored in the NVRAM 18 when the facsimile apparatus enters the low power consumption mode is added to the prepared time data, and the recovery level is determined in accordance with the flow chart shown in FIG. 2 based on the sum time data and the recovery operation is executed (step S111).

In accordance with the present embodiment, in the facsimile apparatus constructed to be shifted from the normal operation mode to the low power consumption mode in the wait state in which no action is conducted, the proper recovery operation may be executed at the wakeup up from the low power consumption mode without consuming unnecessary ink and the time before the print means is ready to print is shortened so that the practicability of the facsimile apparatus which builds in the ink jet printer is significantly enhanced.

In the present embodiment, when the facsimile apparatus enters the low power consumption mode, the content of the recovery timer 12a of the printer unit 200 is stored in the backup NVRAM and the content of the recovery counter la is added thereto at the time of wakeup from the low power consumption mode to acquire the time to determine the recovery level. Alternatively, the content of the recovery timer 12a may be notified to the facsimile control unit 100 when the facsimile apparatus enters the low power consumption mode, the notified count is set in the recovery timer 1a as an initial value and the counting is continued, and the count of the recovery timer 1a may be notified to the printer unit 200 at the time of wakeup from the low power consumption mode.

Further, the recovery time may be counted by only the timer in the facsimile control unit 100 without providing the recovery timer in the printer unit 200, and the recovery time may be notified from the facsimile control unit 100 to the printer unit 200 at the time of wakeup from the low power consumption mode.

Embodiment 2

Figure 18:
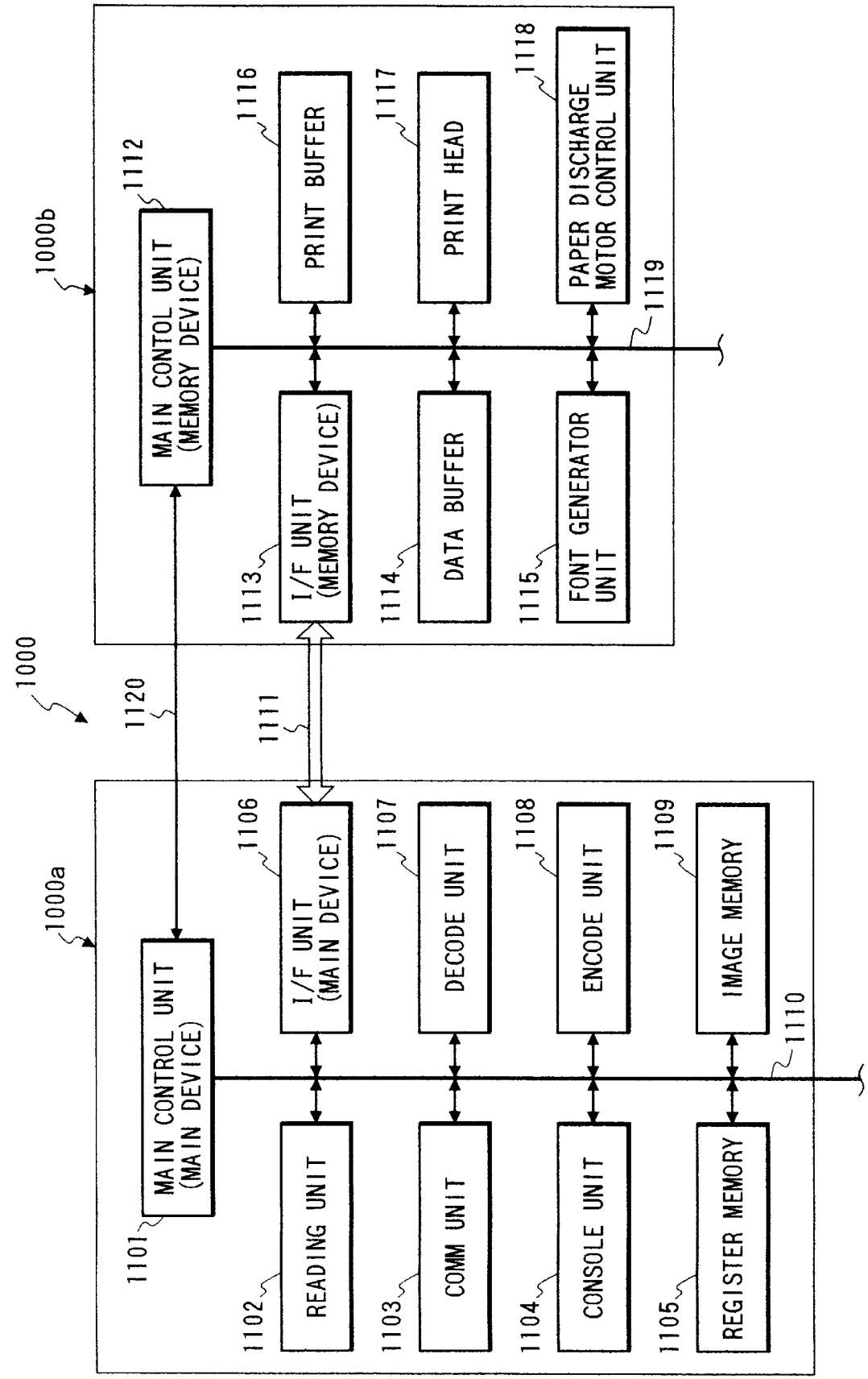
FIG. 18 shows a block diagram of a configuration of a facsimile apparatus in accordance with an Embodiment 2 of the present invention.

An Embodiment 2 of the present invention is explained for a facsimile apparatus as an example of the communication apparatus. FIG. 18 shows a block diagram of the facsimile apparatus in accordance with the Embodiment 2 of the present invention. In FIG. 18, numeral 1000 denotes a facsimile apparatus which is divided into a main unit (main unit) 1000a and a recording unit (recording means) 1000b.

The main unit 1000a comprises a main unit main control unit (unit control means) 1101, a read unit 1102, a communication unit 1103, a console unit 1104, a registration memory 1105, a main unit I/F (interface) unit 1106, a decoding unit 1107, a coding unit 1108 and an image memory 1109. The units 1102 to 1109 are connected to the main unit main control unit 1101 through a main system bus 1110.

The main unit main control unit 1101 controls the entire main unit 1000 and comprises an MPU, a ROM and a RAM.

The read unit 1102 optically reads a document sheet and converts it to image data. The communication unit 1103 conducts the connection and disconnection of a call, the modulation of transmission data and the demodulation of received data, and exchanges data with a destination station through a line. The console unit 1104 inputs and displays various types of information and comprises operation keys and displays. The registration memory 1105 stores telephone number data such as one-touch dial numbers and communication result information. The main unit I/F unit 1106 is an interface with the record unit 1000*b*. The decoding unit 1107 decodes image data. The coding unit 1108 codes the image data. The image memory 1109 stores the received image.

The recording unit 1000*b* comprises a recording unit main control unit (record control means) 1112, a recording unit I/F (interface) unit 1113, a data buffer 1114, a font generation unit 1115, a print buffer 1116, a print head 1117 and a sheet feed/ejection motor control unit 1118. The units 1113 to 1118 are connected to the recording unit main control unit 1112 through a system bus 1119.

The recording unit main control unit 1112 controls the entire recording unit 1000*b* and comprises an MPU (microprocessor unit), a ROM (read-only memory) and a RAM (random access memory). The bilateral record correction value to be described later is stored (registered) in the RAM. This operation is conducted from the console unit 1104 of the main unit 1000*a* in a service mode. The recording unit I/F unit 1113 is an interface with the main unit 1000*a*. The data buffer 1114 temporarily stores the print data from the main unit 1000*a* received by the recording unit I/F unit 1113. The font generation unit 1115 generates the font data corresponding to the print data. The print buffer 1116 stores the raster data before the transfer to the print head 1117. The print buffer 1116 discharges the ink droplets in accordance with the data from the print buffer 1116. The sheet feed/ejection motor control unit 1118 controls the motor for feeding the record sheet.

The main unit I/F unit 1106 and the recording unit I/F unit 1113 are connected through an I/F (interface) signal line 1111. The main unit main control unit 1101 and the recording unit main control unit 1112 are connected through a signal line 1120.

Figure 21:
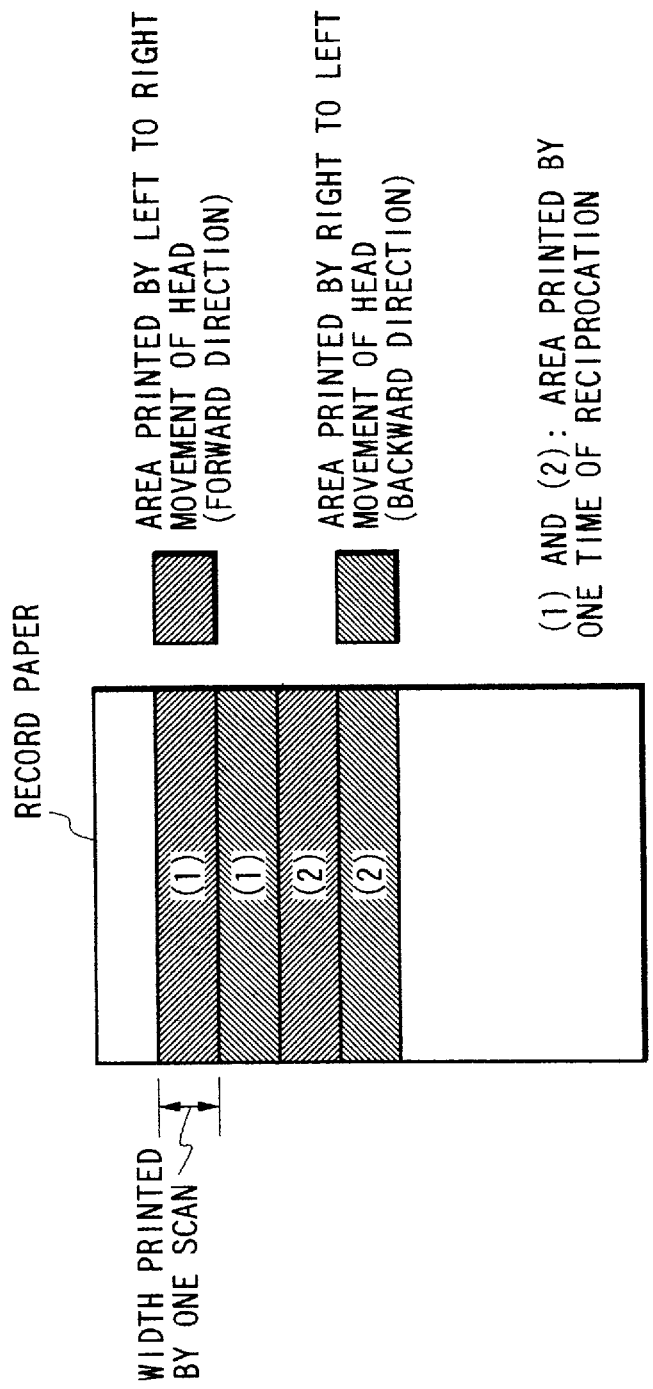
FIG. 21 shows a reciprocal print operation of an ink jet printer which is the record unit in the facsimile apparatus.
Figure 22:
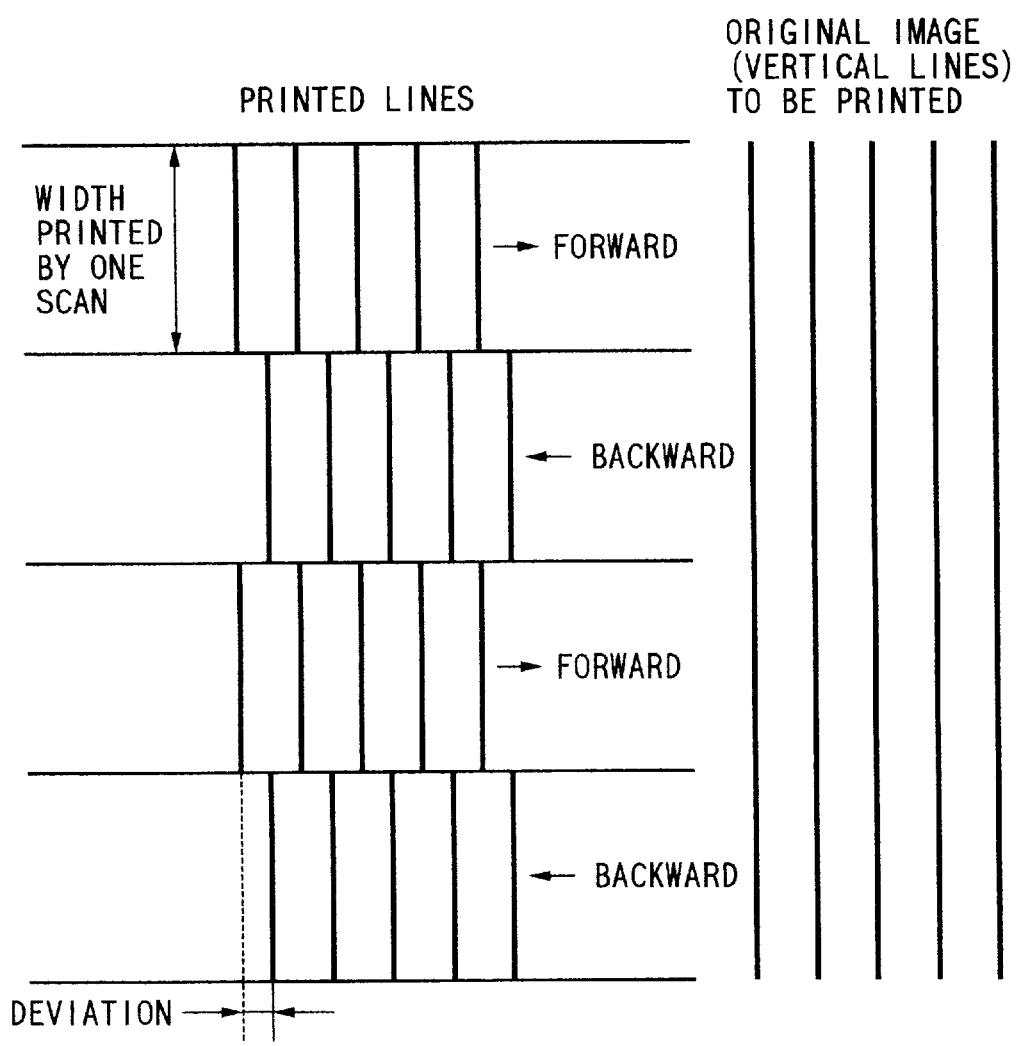
FIG. 22 shows a deviation of back and forth print positions in the reciprocal print operation of the ink jet printer which is the record unit in the facsimile apparatus.

The ink jet printer which is the recording unit 1000*b* in the facsimile apparatus 1000 of the present embodiment is of bilateral printing type in which the print head 1117 is reciprocally moved as shown in FIG. 21. In this type, there is a deviation between a forward print position and a backward print position in an initial state. The deviation is shown in FIG. 22. Since the deviation is prominent when a vertical line is printed, it should be corrected.

A correction value for correcting the deviation is the bilateral record correction value.

In the present embodiment, when the facsimile apparatus is shifted to an ESS mode (energy saving stand-by mode), the supply of the power to the recording unit 1000*b* is completely shut off (power-off) and the recording unit main control unit 1112 cannot hold the bilateral record correction value in the internal RAM. Accordingly, each time the facsimile apparatus is returned from the ESS mode to the normal operation mode and the power of the recording unit 1000*b* is turned on, it is necessary to set the bilateral record correction value to the recording unit main control unit 1112.

In the present embodiment, for the purpose of this setting process, the main unit main control unit 1101 sends the bilateral record correction value to the recording unit main control unit 1112 through the both I/F units 1106 and 1113 each time the power of the recording unit 1000*b* is turned on.

Figure 19:
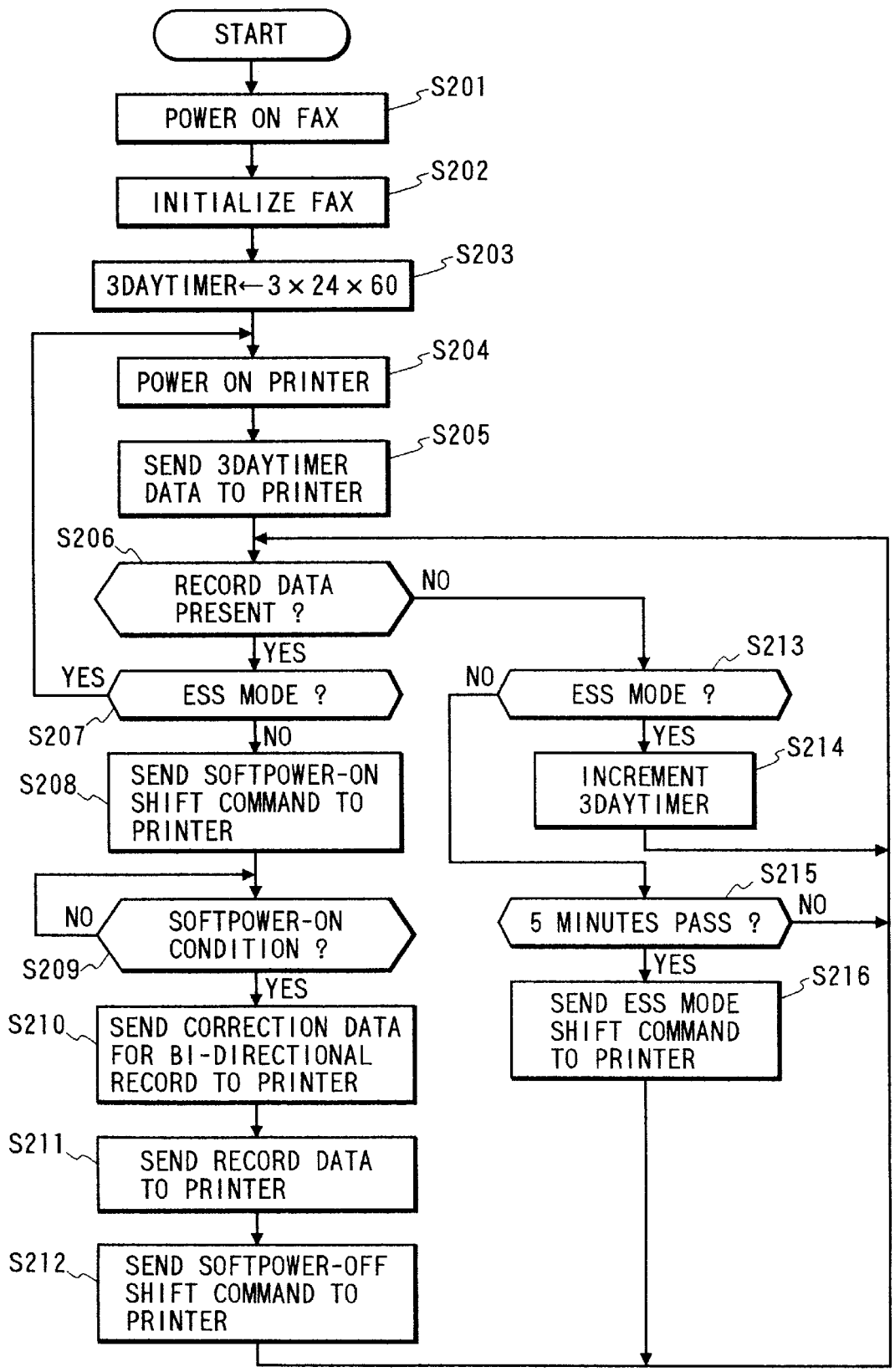
FIG. 19 shows a flow chart of a control process of a record operation of a main unit in the facsimile apparatus.

Referring to a flow chart of FIG. 19, a record operation of the main unit 1000*a* in the facsimile apparatus 1000 of the present embodiment is explained.

First, the power of the facsimile apparatus 1000 is turned on in a step S201 to supply the power to the facsimile apparatus 1000. Then, the facsimile apparatus 1000 is internally initialized in a step S202. In a step S203, a 3-day timer (in unit of minute) which is a timer to monitor an interval of the recovery operation of the printer unit 1000*b* which is the recording unit is set to 3×24×60. Then, in a step S204, the power of the printer 1000*b* is turned on to supply the power to the printer 1000*b*. The subsequent control is described with reference to FIG. 20.

In a step S205, the 3-day timer set in the step S202 is transmitted to the printer 1000*b*. Then, in a step S206, whether record data is present or not is determined, and if it is present, whether the operation mode is the ESS (energy saving) mode or not is determined in a step S207. If it is the ESS mode, the process returns to the step S204 to turn on the power of the printer 1000*b* to activate the printer 1000*b*. If it is not the ESS mode, a soft power-on shift command which is a serial command to shift the printer 1000*b* to be ready to print is sent to the print 1000*b* in a step S208 and the process proceeds to a next step S209.

In the step S209, whether the printer 1000*b* is in the soft power-on state or not is determined until it is rendered to the soft power-on state. When it is rendered to the soft power-on state, a correction value for the deviation of the carriage for the bilateral record is sent to the printer 1000*b* in a step S210. In a step S211, the record data is sent to the printer 1000*b* through a parallel port. When the recording is completed, a soft power-off shift command which is a serial command to shift the printer 1000*b* to a rest state is sent to the printer 1000*b* in a step S212 and the process returns to the step S206.

On the other hand, if the record data is not present in the step S206, whether the operation mode is the ESS mode or not is determined in a step S213. If it is the ESS mode, the 3-day timer is incremented at an interval of one minute in a step S214 and then the process returns to the step S206. If it is not the ESS mode, whether five minutes has elapsed since factor to operate the facsimile apparatus went or not is determined in a step S215. If five minutes has not elapsed, the process returns to the step S206, and if five minutes has elapsed, an energy saving mode (ESS mode) shift command is sent to the printer 1000*b* in a step S216 and then the process proceeds to the step S206.

Figure 20:
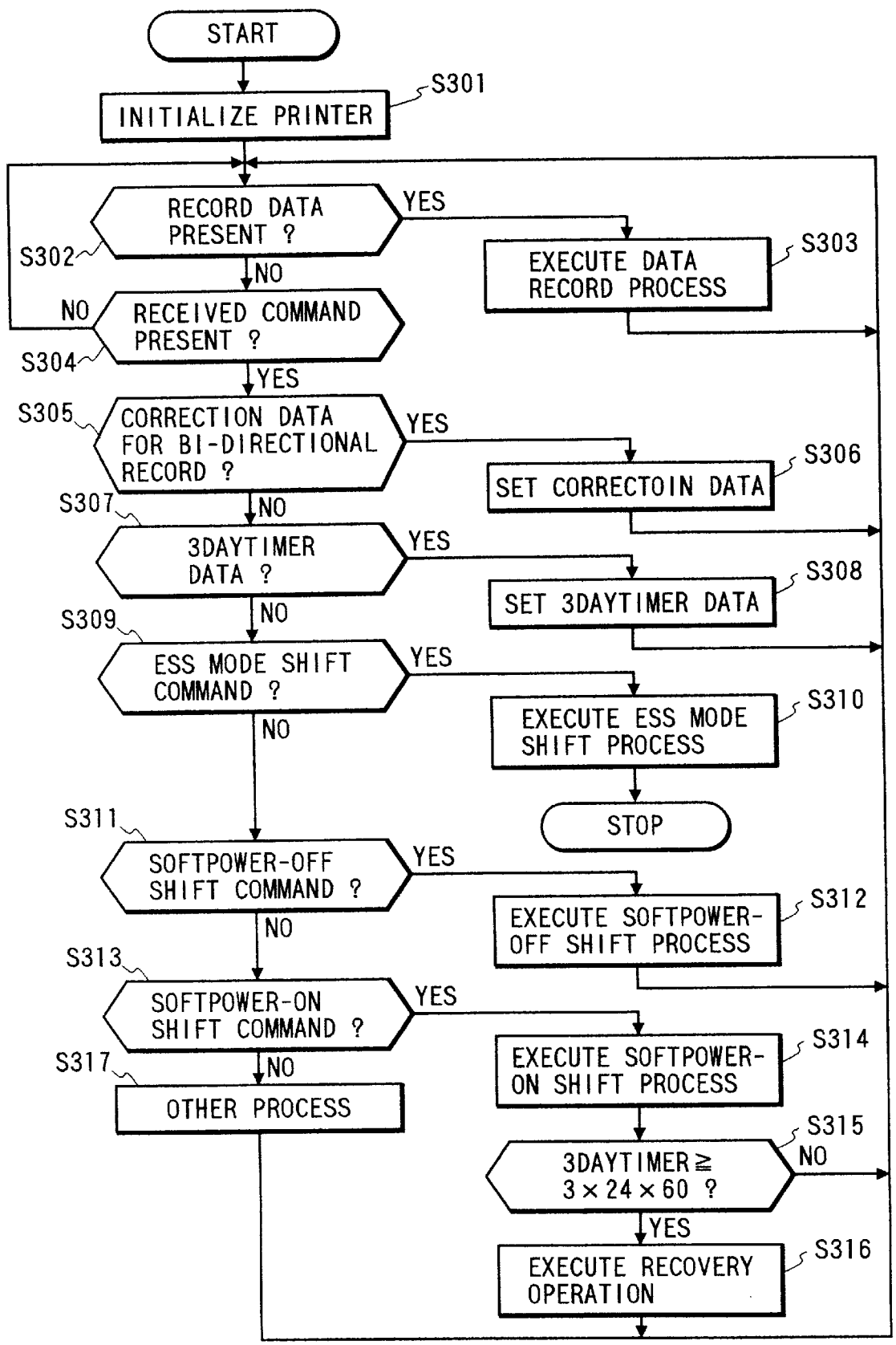
FIG. 20 shows a flow chart of a control process of a record operation of a record unit in the facsimile apparatus.

A recording operation of the printer 1000*b* in the facsimile apparatus 1000 of the present embodiment is now explained with reference to a flow chart of FIG. 20.

When the power of the printer 1000*b* is turned on (the power of the printer 1000*b* is turned on in the step S204 of FIG. 2), the setting to initialize the printer 1000*b* is made in a step S301. Then, in a step S302, whether the record data has been received at the parallel port or not (whether the record data is present or not) is determined. If the record data is present, the record data is outputted in a step S303 and then the process returns to the step S302. If the record data is not present, whether the serial command has been received or not (whether the received command is present or not) is determined in a step S304. If the received command is not present, the process returns to the step S302, and if the received command is present, whether the received command is the correction value for the bilateral record or not is determined in a step S305. If the received command is the correction value for the bilateral record, the correction value for the bilateral record is set in a step S306 and then the process returns to the step S302.

On the other hand, if the received command is not the correction value for the bilateral record in the step S305, whether it is the 3-day timer data or not is determined in a step S307. If it is the 3-day timer data, the 3-day timer is set in a step S308 and then the process returns to the step S302. If it is not the 3-day timer data, whether it is the energy saving mode (ESS mode) shift command or not is determined in a step S309. If it is the energy saving mode shift command, the shift to the energy saving mode is conducted in a step S310 and then the process is stopped. If it is not the energy saving mode shift command, whether it is the soft power-off shift command or not is determined in a step S311. If it is the soft power-off shift command, the shift to the soft power-off is conducted in a step S312 and then the process returns to the step S302.

On the other hand, if it is not the soft power-off shift command in the step S311, whether it is the soft power-on shift command or not is determined in a step S313. If it is the soft power-on shift command, the shift to the soft power-on is conducted in a step S314 and then the process proceeds to a step S315. In the step S315, whether the 3-day timer is not smaller than 3×24×60 (3 days) or not is determined. If it is smaller than 3×24×60, the process returns to the step S302. If it is not smaller than 3×24×60 (3 days), the recovery operation is conducted in a step S316, and after the recovery operation, the 3-day timer is set to 0 and then the process returns to the step S302.

On the other hand, if it is not the soft power-on shift command in the step S313, a process for other command is conducted in a step S317 and then the process returns to the step S302.

In accordance with the facsimile apparatus of the present embodiment, the internal timer of the ink jet printer 1000b is managed by the main unit 1000a, and when the supply of the power to the printer 1000b is to be stopped for power saving, the non-power-supply time of the printer 1000b is notified from the main unit 1000a to the printer 1000b by the serial communication unit 1102 when the printer is powered on next time so that the internal timer of the printer 1000b is corrected to conduct the recovery operation of the printer 1000b at the correct time interval. Since the main unit 1000a manages the bilateral record correction value in the ink jet printer 1000b initially set for each unit, the bilateral record correction value is notified from the main unit 1000a to the printer 1000b through the serial communication when the printer 1000b is rendered to the record stand-by state so that the printer 1000b can be correctly operated in accordance with the initially set bilateral record correction value even if the printer 1000b cannot store the bilateral correction value.

What is claimed is:

1. A communication apparatus comprising:

a printer for discharging ink from nozzles and reciprocally printing by reciprocally driving said nozzles to record an image on a record sheet;

record control means for controlling said printer;

a main unit for conducting communication, reading and data coding/decoding which are fundamental operations of a facsimile apparatus;

unit control means for controlling said main unit; and communication means for communicating data and commands between said control means;

said unit control means transmitting a correction value necessary for the correction of bilateral record of said nozzles through communication means when said printer is rendered to a normal operation mode from a power saving mode; and said record control means controlling the recording in accordance with the bilateral record correction value.

2. A communication apparatus according to claim 1, further comprising correction value registration means for registering the bilateral record correction value, wherein the external setting of the bilateral record correction value of said record control means through said serial communication means is enabled by registering the bilateral record correction value by said correction value registration means.

3. A communication apparatus according to claim 1 wherein no power is supplied to said printer in the power saving mode.

4. A communication apparatus according to claim 1 wherein said communication means is a serial interface.

5. A communication apparatus according to claim 1 wherein said communication apparatus is a facsimile apparatus.

* * * * *

UNITED STATES PATENT AND TRADEMARK OFFICE
CERTIFICATE OF CORRECTION

PATENT NO. : 5,819,013

DATED : October 6, 1999

INVENTOR(S) : TOSHIKI MIYAZAKI ET AL.

It is certified that error appears in the above-identified patent and that said Letters Patent is hereby corrected as shown below:

[54] TITLE

"VALVE" should read --VALUE--.

COLUMN 1

Line 4, "VALVE" should read --VALUE--.

Signed and Sealed this

Eighteenth Day of January, 2000

Attest:

Q. TODD DICKINSON

*Attesting Officer*  *Commissioner of Patents and Trademarks*

UNITED STATES PATENT AND TRADEMARK OFFICE
CERTIFICATE OF CORRECTION

PATENT : 5,819,013
DATED : October 6, 1998
INVENTOR(S) : TOSHIKI MIYAZAKI ET AL.

It is certified that error appears in the above-identified patent and that said Letters Patent is hereby corrected as shown below:

On the title page, item

"VALVE" should read --VALUE--.

COLUMN 1

Line 4, "VALVE" should read --VALUE--.

This certificate supersedes Certificate of Correction issued January 18, 2000.

Signed and Sealed this

Fourth Day of July, 2000

*Attest:*

Q. TODD DICKINSON

*Attesting Officer*     *Director of Patents and Trademarks*